(12) United States Patent
Kresge

(10) Patent No.: US 10,077,791 B2
(45) Date of Patent: Sep. 18, 2018

(54) COUPLING DEVICE

(71) Applicant: David W. Kresge, Las Vegas, NV (US)

(72) Inventor: David W. Kresge, Las Vegas, NV (US)

( * ) Notice: Subject to any disclaimer, the term of this patent is extended or adjusted under 35 U.S.C. 154(b) by 34 days.

(21) Appl. No.: 14/897,442

(22) PCT Filed: Jun. 10, 2014

(86) PCT No.: PCT/US2014/041716
§ 371 (c)(1),
(2) Date: Dec. 10, 2015

(87) PCT Pub. No.: WO2014/201007
PCT Pub. Date: Dec. 18, 2014

(65) Prior Publication Data
US 2016/0138631 A1    May 19, 2016

Related U.S. Application Data

(60) Provisional application No. 61/833,249, filed on Jun. 10, 2013.

(51) Int. Cl.
*F16B 7/04* (2006.01)
*F16D 1/112* (2006.01)

(52) U.S. Cl.
CPC .............. *F16B 7/042* (2013.01); *F16D 1/112* (2013.01); *Y10S 464/901* (2013.01); *Y10T 403/604* (2015.01); *Y10T 403/7081* (2015.01)

(58) Field of Classification Search
CPC ...... F16B 7/042; F16B 7/0413; F16B 7/0406; F16B 7/05; F16B 7/105; F16C 1/08; Y10T 403/30; Y10T 403/557; Y10T 403/5793; Y10T 403/591; Y10T 403/599; Y10T 403/602; Y10T 403/604; Y10T 403/7075; Y10T 403/7077; Y10T 403/7079; Y10T 403/7081; Y10T 403/7088; Y10T 403/75; F16D 1/02; F16D 1/06; F16D 1/112; F16D 1/108
USPC ....... 464/182, 901; 403/49, 297, 314, 322.1, 403/325, 327, 328, 376, 377, 378, 379.1, 403/379.5, 408.1, DIG. 4
See application file for complete search history.

(56) References Cited

U.S. PATENT DOCUMENTS 3,449,003 A * 6/1969 Hunt .................. E03C 1/30
403/324
4,385,849 A * 5/1983 Crain ..................... F16B 7/105
343/901

(Continued)

*Primary Examiner* — Josh Skroupa
(74) *Attorney, Agent, or Firm* — David E. Crawford; Crawford IP Law

(57) ABSTRACT

A shaft coupling device includes a first portion, a second portion, a pair of buttons, a biasing member, and at least one button stop. The first portion has a female couple section and a first device mounting section. The second portion has a male couple section and a second device mounting section. The male couple section is configured so as to be receivable within the cavity of the female couple section. The biasing member, the button stop, and at least a portion of the first and second buttons are disposed within the second cavity of the male couple section, with the biasing member disposed between the buttons, biasing the buttons radially outwardly. The button stop limits the radially inward travel of the buttons.

15 Claims, 5 Drawing Sheets

(56) References Cited

U.S. PATENT DOCUMENTS

| | | | | | |
|---|---|---|---|---|---|
| 4,508,468 | A | * | 4/1985 | Irwin | F16D 1/02 |
| | | | | | 403/109.3 |
| 4,595,383 | A | * | 6/1986 | Nienhaus | F16C 3/03 |
| | | | | | 403/109.3 |
| 5,083,883 | A | * | 1/1992 | Ueda | B25G 3/26 |
| | | | | | 403/316 |
| 5,255,993 | A | * | 10/1993 | Kovacs | F16B 7/042 |
| | | | | | 403/316 |
| 5,287,869 | A | * | 2/1994 | Wu | A45B 19/04 |
| | | | | | 135/25.1 |
| 6,585,444 | B1 | | 7/2003 | Podbutzky | |
| 6,688,800 | B2 | * | 2/2004 | Kresge | F16D 1/112 |
| | | | | | 403/322.1 |
| 6,719,479 | B1 | * | 4/2004 | Marsh | E21B 17/046 |
| | | | | | 166/242.6 |
| 7,967,259 | B2 | * | 6/2011 | Nakatani | F16B 7/042 |
| | | | | | 248/125.8 |
| 8,221,248 | B2 | * | 7/2012 | Wang | B25J 19/063 |
| | | | | | 464/162 |
| 8,926,214 | B2 | * | 1/2015 | Lah | A45B 9/00 |
| | | | | | 135/75 |
| 8,950,478 | B2 | * | 2/2015 | Brække | E21B 17/046 |
| | | | | | 166/170 |
| 2002/0164205 | A1 | * | 11/2002 | Kresge | F16D 1/112 |
| | | | | | 403/322.1 |
| 2010/0054852 | A1 | * | 3/2010 | Snyder | B25G 1/04 |
| | | | | | 403/301 |
| 2010/0122718 | A1 | * | 5/2010 | Lah | A45B 9/00 |
| | | | | | 135/75 |
| 2015/0300415 | A1 | * | 10/2015 | Russell | F16D 1/112 |
| | | | | | 403/306 |

\* cited by examiner

COUPLING DEVICE

This application claims priority to U.S. patent application Ser. No. 61/833,249 filed Jun. 10, 2013.

BACKGROUND OF THE INVENTION

1. Technical Field

This invention relates to mechanical coupling devices in general, and to mechanical coupling devices that are hand operable in particular.

2. Background Information

Presently available coupling devices for selectively coupling shaft sections typically utilize an attachment mechanism such as an independent pin or key, screw threads, or a spring-loaded cylindrical, or spherical shaped, button. A problem with coupling devices that utilize an independent pin or key is that the pin or key is often misplaced and/or requires a tool for implementation. A problem with coupling devices that utilize screw threads is that if the application requires that the shaft be rotated, the threaded sections can become detached from one another. If a shaft section becomes decoupled in an inaccessible area (e.g., a chimney), the shaft section remaining in the inaccessible area can present a significant problem.

Presently available coupling devices that utilize spring-loaded cylindrical or spherical shaped buttons solve some of the problems associated with screw threads and pins, but they too have disadvantages or are limited in application. Spring-loaded cylindrical or spherical shaped button-type couplings are typically utilized on applications where the shafts to be coupled are thin wall type shafts; e.g., vacuum shaft sections. The button is mounted on the male portion of the coupling and is biased outwardly. Inserting the male portion of the coupling into the female portion causes the button to be deflected inwardly, thereby allowing the male portion to be received within the female portion. When the outwardly biased button encounters an aperture within the female portion, the button extends outwardly through the aperture in the thin wall of the female portion and thereby positively couples the male and female portions and the shafts attached thereto. The male and female portions can be decoupled by applying pressure from a finger on the button, pushing the button inwardly below the inner surface of the female portion. This manner of decoupling works well for thin wall applications because skin from the operator's finger will extend a distance into the aperture provided sufficient pressure is applied. The distance the finger extends into the aperture is substantially equal to or greater than the wall thickness of the female coupling portion.

Applications that require a stronger shaft and coupling device, particularly those where rotational torque is transmitted through the shaft, often utilize a thick wall coupling device. Some existing thick wall coupling devices utilize a spring mounted cylindrical button in the same manner as that described above. One problem with using a cylindrically shaped button in a thick wall coupling device application is that it becomes difficult or impossible to depress the button by finger (hereinafter "finger" shall be defined as any digit on a hand including a thumb) below because the finger skin only extends a limited amount into the aperture. Consequently, the finger by itself is unable to depress the button inwardly a distance sufficient to disengage the button from the aperture within the female portion. This is particularly true in applications where the operator is wearing work gloves that are less compliant than skin. In such cases, it becomes necessary to use a tool to depress the button the required distance. Another problem with using a cylindrical button in a cylindrical thick wall coupling device is that the button extending between the male and female portions carries any load torsionally or axially transmitted between shaft sections. As a result, the ability of the shaft sections to transmit a load is likely to be limited by the strength of the cylindrical button.

DISCLOSURE OF THE INVENTION

According to an aspect of the present invention, a shaft coupling device is provided that includes a first portion, a second portion, a first button, a second button, a spring and at least one button stop. The first portion has a female couple section and a first shaft mounting section. The female couple section includes a cavity surrounded at least in part by a wall, a first aperture extending through the wall, and a second aperture extending through the wall, which first and second apertures are aligned with one another along a first axis. The second portion has a male couple section and a second shaft mounting section. The male couple section is configured so as to be receivable within the cavity of the female couple section. The male couple section includes a second cavity surrounded at least in part by a wall, a third aperture extending through the wall, a fourth aperture extending through the wall, which third and fourth apertures are aligned with one another along a second axis. The first button has a body with a side surface extending between a contact surface and a base surface, and at least one flange extending outwardly from the side surface. The second button has a body with a side surface extending between a contact surface and a base surface, and at least one flange extending outwardly from the side surface. The button stop has an end panel, a pair of side panels, and a stop flange. The stop flange and the side panels extend lengthwise outwardly from the end panel. The spring, the button stop, and at least a portion of the first and second buttons are disposed within the second cavity of the male couple section, with the spring disposed between the buttons, biasing the buttons radially outwardly. The side panels of the button stop are disposed on opposite sides of the spring. The stop flange extends outwardly from the end panel in a direction toward the spring. When the first and second portions are coupled, the first and second buttons are biased radially outwardly in a normal position, and a portion of the first button body extends through the third aperture of the male couple section and into the first aperture of the female couple section, and a portion of the second button body extends through the fourth aperture of the male couple section and into the second aperture of the female couple section.

In a further embodiment of the foregoing aspect, the first and second buttons are shaped the same.

In a further embodiment of the foregoing aspect and embodiments, the body of at least one of the first or second buttons has a width and a length, and the length is greater than the width.

In a further embodiment of the foregoing aspect and embodiments, the body of the at least one of the first or second buttons is oval shaped.

In a further embodiment of the foregoing aspect and embodiments, the first button has a tapered surface extending between the contact surface and the side surface of the first button, and the second button has a tapered surface extending between the contact surface and the side surface of the second button.

In a further embodiment of the foregoing aspect and embodiments, the at least one button stop includes a first button stop and a second button stop, each having the end panel, the pair of side panels, and the stop flange, with the stop flange and the side panels extending lengthwise outwardly from the end panel. The first button stop is disposed on a first side of the spring within the second cavity of the male couple device, and the second button stop is disposed on a second side of the spring within the second cavity of the male couple device, such that the side panels of each button stop extend outwardly toward the side panels of the other button stop. The stop flange of each button stop extends outwardly toward the stop flange of the other button stop.

In a further embodiment of the foregoing aspect and embodiments, the side panels of each button stop have a length and the stop flange of each button stop has a length, and the length of the side panels for each button stop are greater than the length of the stop panel for that respective button stop.

In a further embodiment of the foregoing aspect and embodiments, the stop flange of the first button stop has a terminal end surface, and the stop flange of the second button stop has a terminal end surface, and the spring is disposed between the terminal end surfaces of the stop flanges.

In a further embodiment of the foregoing aspect and embodiments, the stop flanges are positioned to prevent the contact surface of one or both of the first button and second button from being disposed radially inward of an inner surface of the cavity of the male couple section.

In a further embodiment of the foregoing aspect and embodiments, the female couple section includes a first cutout disposed in the wall of the female couple section, which first cutout intersects with the first aperture, and a second cutout disposed in the wall of the female couple section, which second cutout intersects with the second aperture.

In a further embodiment of the foregoing aspect and embodiments, the first shaft mounting section includes a shaft bore for receiving a shaft.

In a further embodiment of the foregoing aspect and embodiments, the second shaft mounting section includes a shaft bore for receiving a shaft.

In a further embodiment of the foregoing aspect and embodiments, the first shaft mounting section is configured to connect a portion of an extension shaft.

In a further embodiment of the foregoing aspect and embodiments, the first shaft mounting section is configured to connect a portion of a tool shaft.

According to another aspect of the present invention, a shaft coupling device is provided that includes a first portion, a second portion, a pair of buttons, a biasing member, and an at least one button stop. The first portion has a female couple section and a first device mounting section. The female couple section includes a first cavity surrounded at least in part by a first wall, a first aperture extending through the first wall, a second aperture extending through the first wall, which first and second apertures are aligned with one another along a first axis. The second portion has a male couple section and a second device mounting section. The male couple section is configured so as to be receivable within the cavity of the female couple section. The male couple section includes a second cavity surrounded at least in part by a second wall, a third aperture extending through the second wall, a fourth aperture extending through the second wall, which third and fourth apertures are aligned with one another along a second axis. Each button has a body with a side surface extending between a contact surface and a base surface. The at least one button stop has a stop flange, extending lengthwise outwardly from the end panel. The biasing member, the button stop, and at least a portion of the first and second buttons are disposed within the second cavity of the male couple section, with the biasing member disposed between the buttons, biasing the buttons radially outwardly. The stop flange extends outwardly from the end panel in a direction toward the biasing member.

These and other objects, features, and advantages of the present invention will become apparent in light of the detailed description of the present invention.

DETAILED DESCRIPTION OF THE INVENTION

Figure 3:
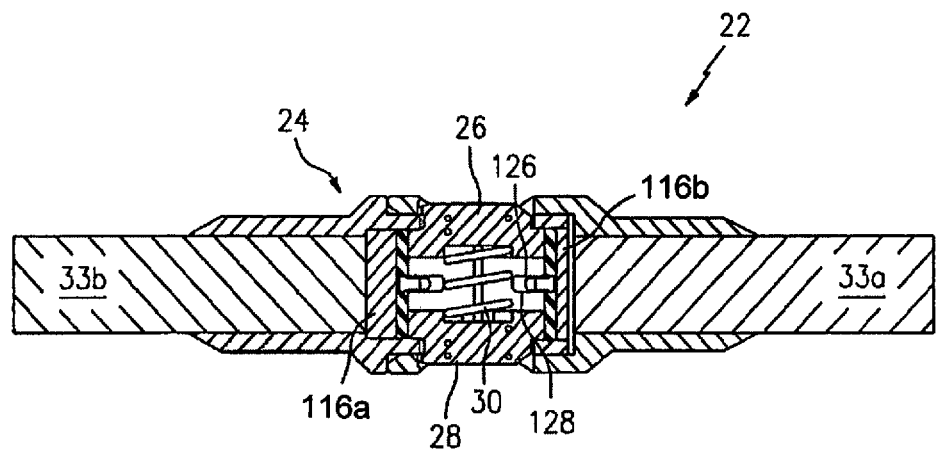
FIG. 3 is a view cross section of the coupling device taken in a plane corresponding to line 3-3 of FIG. 2, illustrating the shaft coupling device in coupled state with the buttons in a normal position.
Figure 4:
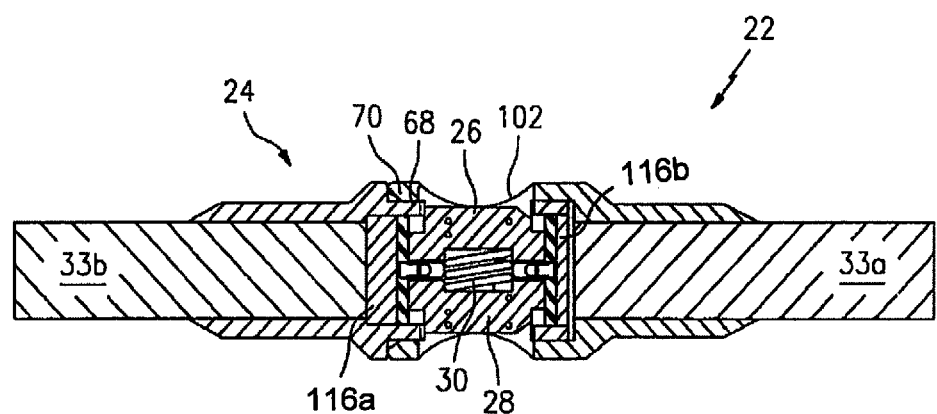
FIG. 4 is a cross section of the coupling device taken in the plane of FIG. 3, illustrating the shaft coupling device in coupled state with the buttons in a depressed position.

Now referring to FIGS. 1-5, a shaft coupling device 20 is provided that includes a first portion 22, a second portion 24, a first button 26, a second button 28, a spring 30 (see FIG. 3), and a pair of button stops 116a, 116b (see FIG. 3).

The first portion 22 includes a female couple section 34 and a shaft mounting section 35. In the embodiment shown in FIG. 5 the shaft mounting section 35 is shown as having a shaft bore 37 for receiving a shaft 33a (see FIG. 1). The shaft mounting section 35 is not limited to this embodiment, and a shaft (or other structure) may be mounted to the first portion 22 of the shaft coupling device 20 by a variety of different mechanical attachment techniques; e.g., the shaft mounting section 35 may include a male or female threaded section that mates with the shaft 33a, or the shaft 33a can be attached to the first portion 22 by a crimp, solder, weld, pin, bond, screw, etc. In the embodiment shown in FIG. 5, the diameter of the shaft mounting section outer surface is less than the diameter of the female couple section outer surface. A tapered surface 39 is disposed between the two outer surfaces to decrease the chance the shaft coupling device 20 will catch on objects during use.

The female couple section 34 includes a cavity 38 surrounded by a wall 40, which wall 40 includes an outer surface 42 and an inner surface 44. The cavity 38 is defined by the inner surface 44, a base end 46 and an open end 48.

The open end 48 may include a chamfer surface 50 to facilitate receipt of a male portion into the cavity 38. The female couple section 34 includes a first aperture 52 and a second aperture 54, which extend through opposite portions of the wall 40; e.g., aligned with each other along an axis 56. The first and second apertures 52, 54 each have a length 58 and a width 60 (see FIG. 2). The first and second apertures 52, 54 will be described hereinafter as having the same geometry, but alternative embodiments may have different geometries. In the embodiment shown in FIG. 5, the cavity 38 extends out through the female couple section 34 of the first portion 22. The cavity 38 may alternatively extend all the way through the first portion 22; e.g., a portion of the cavity 38 may act as the shaft bore 37 in the shaft mounting section 35. The first and second apertures 52, 54 each have a shape that is complementary (e.g., mating) to the shape of the first and second buttons 26, 28, as will be described below, to enable a slide fit between the buttons and respective apertures.

In the embodiment shown in Figures, the shaft coupling device 20 is shown having a cylindrical shape. The shaft coupling device 20 can assume other shapes alternatively in part or in whole; e.g., the external shape of the shaft coupling device 20 may be cylindrical and the mating portions (e.g., the female couple section cavity 38 and the male portion) of the shaft coupling device 20 may be non-cylindrical or vice versa.

Figure 1:
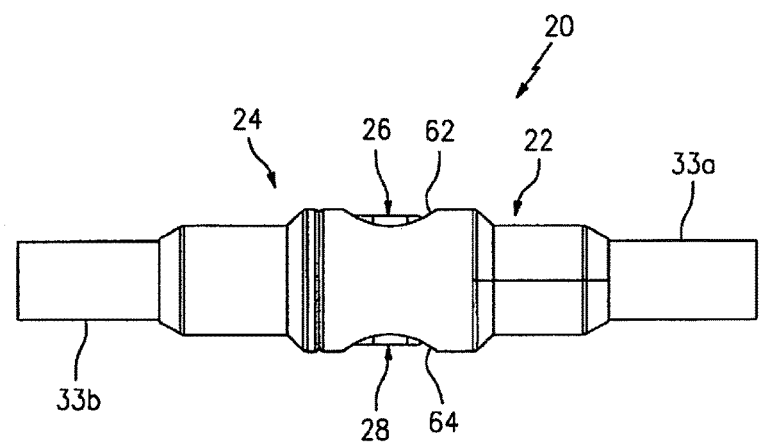
FIG. 1 is a side view of a shaft coupling device.
Figure 2:
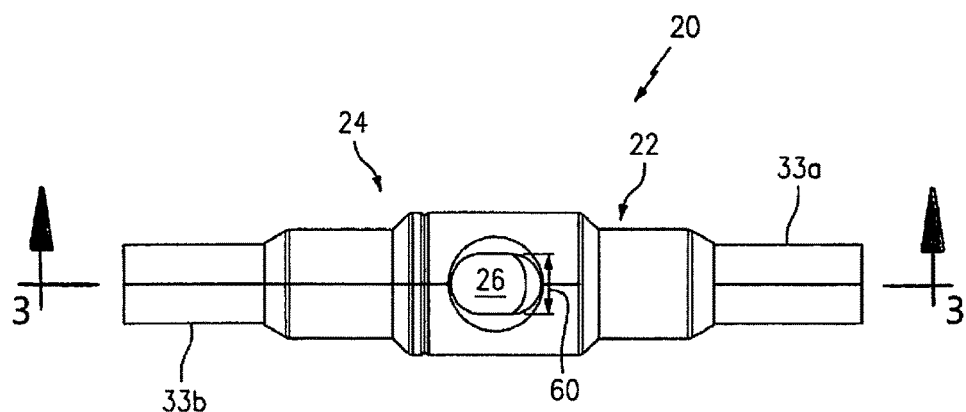
FIG. 2 is a top view of the shaft coupling device of FIG. 1.
Figure 5:
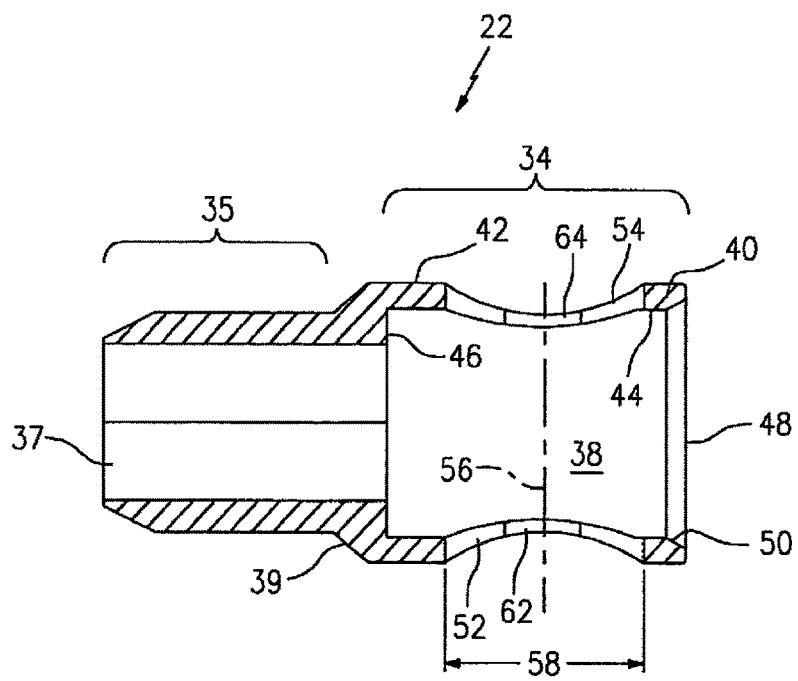
FIG. 5 is a cross section of a first portion of the coupling device taken in the plane of FIG. 3.

The female couple section 34 may include a first cutout 62 and a second cutout 64 (see also FIG. 1). The cutouts 62, 64 shown in the Figures are shaped the same. In alternative embodiments, the first and second cutouts 62, 64 may assume respectively different configurations. Each cutout 62, 64 intersects with the respective aperture 52, 54 disposed within the wall 40 of the female couple section 34. Each cutout 62, 64 is positioned so that base of the cutout 62, 64 substantially intersects with the wall inner surface 44 that defines the cavity 38 within the female couple section 34. The width of each cutout 62, 64 is preferably selected to accommodate the size of an operator's finger, and in some applications a finger covered by a glove. The cutouts 62, 64 shown in FIG. 5 are oriented substantially perpendicular to the length of the respective aperture 52, 54 within the female couple section 34; i.e., along an axis extending out of the page perpendicular to axis 56. An advantage of the perpendicular orientation is that it facilitates operation by enabling the operator to access the buttons in two different directions, which can be quite helpful in applications where space is tight.

Figure 6:
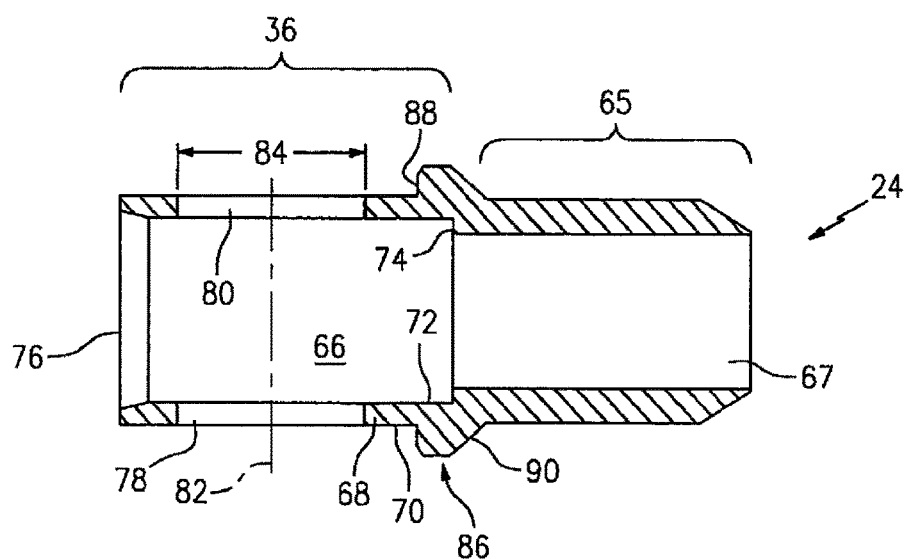
FIG. 6 is a cross section of a second portion of the coupling device taken in the plane of FIG. 3.

Now referring to FIG. 6, the second portion 24 includes a male couple section 36 and a shaft mounting section 65. The shaft mounting section 65 is shown as having a shaft bore 67 for receiving a shaft 33b (see FIG. 1). The shaft mounting section 65 is not limited to this embodiment, and a shaft 33b (or other structure) may be mounted to the second portion 24 of the shaft coupling device 20 by a variety of different mechanical attachment techniques; e.g., the shaft mounting section 65 may include a male or female threaded section that mates with the shaft 33b, or the shaft 33b can be attached to the first portion 22 by a crimp, solder, weld, pin, bond, screw, etc.

The male couple section 36 includes a cavity 66 surrounded by a wall 68. The wall 68 has an outer surface 70 and an inner surface 72. The cavity 66 is defined by the inner surface 72, a base end 74, and an open end 76. The male couple section 36 includes a first aperture 78 and a second aperture 80 that extend through opposite portions of the wall 68; e.g., aligned with each other along an axis 82. The first and second apertures 78, 80 each have a length 84 and a width. The first and second apertures 78, 80 will be described hereinafter as having the same geometry, but alternative embodiments may have different geometries. In the embodiment shown in FIG. 6, the cavity 66 extends out through the male couple section 36 of the second portion 24. The cavity 66 may alternatively extend all the way through the second portion 24; e.g., a portion of the cavity 66 may act as the shaft bore 67 in the shaft mounting section 65. The first and second apertures 78, 80 each have a shape that is complementary (e.g., mating) to the shape of the first and second buttons 26, 28, as will be described below, to enable a slide fit between the buttons 26, 28 and respective apertures 78, 80. In some embodiments (e.g., like that shown in FIG. 6), the second portion 24 includes a stop flange 86 extending radially outward from the outer surface 70 of the wall 68. The stop flange 86 includes a first surface 88 that may be contacted by the female couple section 34 of the first portion 22 when the shaft coupling device 20 is coupled, and a tapered surface 90 on the opposite side of the stop flange 86 to decrease the chance the shaft coupling device 20 will catch on objects during use.

The male couple section 36 is configured to mate with the cavity 38 of the female couple section 34; i.e., configured so that the male couple section 36 may be received within the cavity 38 of the female couple section 34. As stated above, the shaft coupling device 20 is shown within the present Figures as cylindrically shaped and the male couple section 36 is therefore cylindrical, but is not limited thereto.

Figure 8:
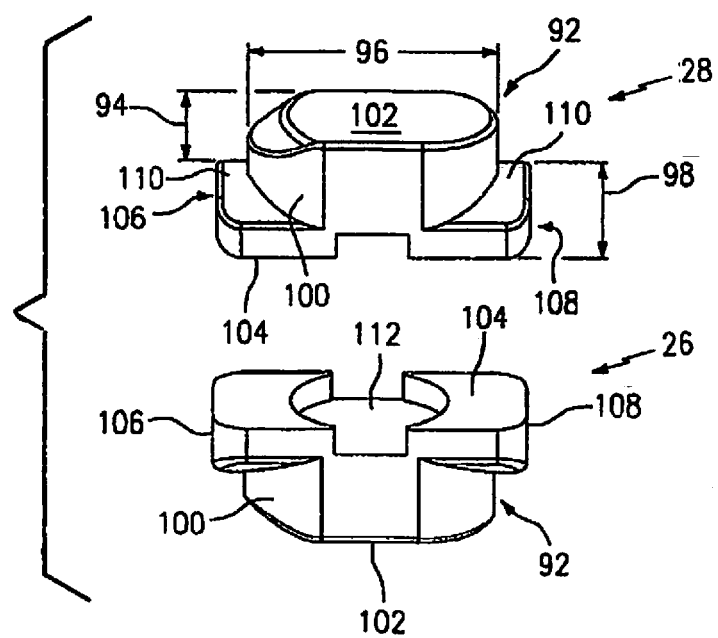
FIG. 8 is perspective of the buttons of the coupling device in opposed orientation as shown in FIG. 7.

In the embodiments shown within the present Figures, the first and second buttons 26, 28 are shown as identical to one another. The present invention is not limited to this embodiment; e.g., the first and second buttons 26, 28 may be shaped differently, etc. To facilitate the description hereinafter within this paragraph, the first and second buttons 26, 28 will be collectively described together as the "button" unless otherwise noted. Now referring to FIG. 8, the button 26, 28 has a body 92 with a width 94, a length 96, a height 98, a side surface 100, a contact surface 102, and a base surface 104. The side surface 100 extends between the contact surface 102 and the base surface 104. The button embodiment shown is oval shaped, having a length 96 that is greater than the width 94. The width 94 and the length 96 extend in a plane that is substantially perpendicular to the height 98. As will be described below, the button oval shape is advantageous, but the button 26, 28 is not limited to this configuration shape; e.g., the button 26, 28 may be elliptical, rectangular, circular, etc. The button 26, 28 further includes a first flange 106 and a second flange 108 extending outwardly from the side surface 100, proximate the base surface 104. Each flange 106, 108 includes a top surface 110, preferably shaped to mate with the inner surface 72 of the male couple section cavity 66; e.g., curved similar to the male couple section cavity inner surface curvature. In the embodiment shown, the first and second flanges 106, 108 extend outwardly in a lengthwise direction. In alternative embodiments the flanges 106, 108 may extend outwardly in a widthwise direction. As can be seen in FIG. 8, the button 26, 28 may include a spring seat cavity 112 disposed in the base surface 104 for seating the spring 30.

In some embodiments, the button body has a tapered surface 114 at one end of the contact surface 102 (i.e., a forward end) to facilitate insertion of the male couple section 36 into the female couple section cavity 38 as will be described below.

The preferred embodiment of the spring 30 is a coil spring. Alternative biasing means including, but not limited to, a leaf spring, elastic material, etc., can be used as well to accommodate different applications. The amount of force provided by the spring 30 can vary to suit the application. The spring 30 is disposed within the cavity of the male couple section 36, and acts between the two buttons 26, 28. In the preferred embodiment, each end of the coil spring 30 is seated within the spring seat cavity 112 of the respective button 26, 28.

Figure 9:
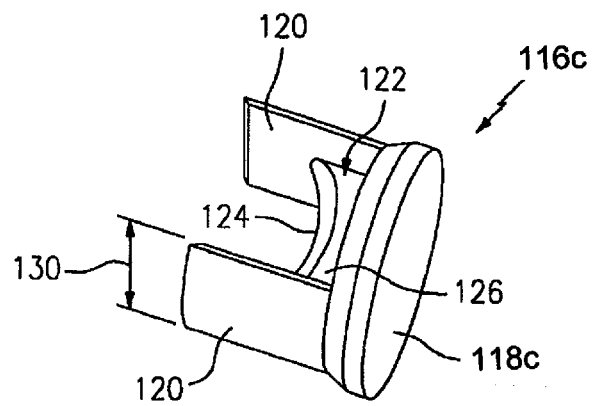
FIG. 9 is a perspective of a button stop similar to one shown in FIG. 7.
Figure 10:
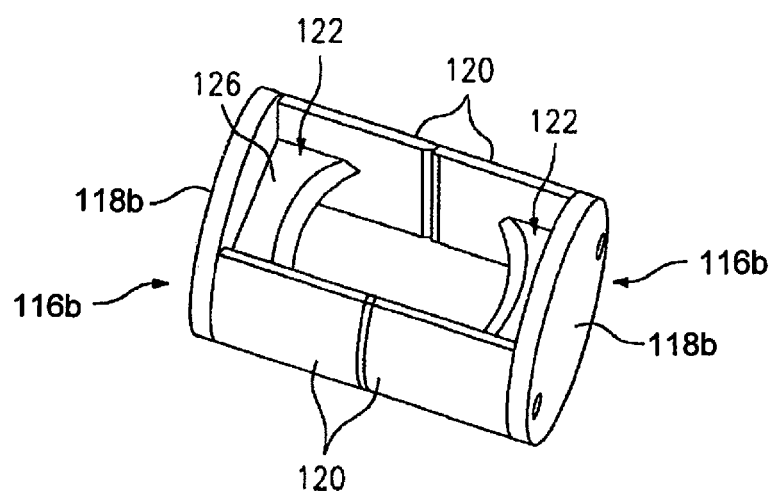
FIG. 10 is a perspective of a pair of button stops similar to one shown in FIG. 3, oriented in the manner they are disposed within a second portion.

FIG. 9 shows one of a pair of button stops 116c. In FIG. 10, the pair of button stops 116b (i.e., a first button stop and a second button stop) is shown as they would be oriented within the cavity of the male couple section 36. In the embodiment shown, the button stops 116b are shown as identical to one another, but in alternative embodiments the first and second button stops may be configured different from one another (e.g., a button stop 116a may be used with a button stop 116b as shown in FIG. 3). Now referring to the button stops 116a, 116b, and 116c collectively as "the button stop 116", the button stop 116 includes an end panel 118, a pair of side panels 120, and a stop flange 122. The end panel 118 and side panels 120 are configured (e.g., curved) to fit within the cavity 66 of the male couple section 36. The stop flange 122 and the side panels 120 extend lengthwise outwardly from the end panel 118. The side panels 120 have a length that is greater than a length of the stop flange 122. In an alternative embodiment, only one of the button stops 116 includes side panels 120, which side panels 120 may extend across to contact the end panel 118 of the opposite button stop 116. The stop flange 122 has a terminal end surface 124 that is arcuately shaped so that the spring 30 may fit between the respective stop flanges 122 as will be explained below. Each stop flange 122 has a first button side surface 126 extending between the terminal end surface 124 and the end panel 118, and an opposing second button side surface 128 extending between the terminal end surface 124 and the end panel 118. The stop flange 122 is not limited to the described geometry and may assume a different geometry operable to be contacted by a button 26, 28 as will be described below. The side panels 120 have a height 130 that terminates to leave heightwise openings when the button stops 116 are disposed within the cavity 66 of the male couple section 36.

Figure 7:
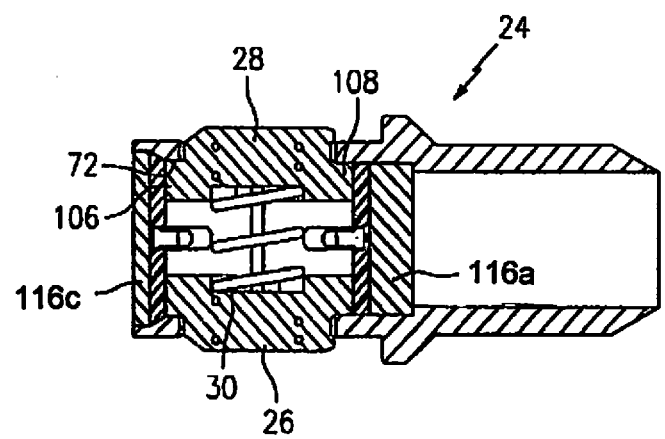
FIG. 7 is a cross section of the second portion of the coupling device similar to FIG. 6 with the buttons, spring and buttons stops mounted within the second portion.

Referring to FIG. 7, when the second portion 24 is assembled, the first and second buttons 26, 28, the button stops 116a, 116c, and the spring 30 are disposed within the cavity 66 of the male couple section 36. The spring 30 acts on both buttons 26, 28 and biases both buttons 26, 28 outwardly. One or both buttons 26, 28 may be positioned in a "normal" position, or in a "depressed" position. In the "normal" position (e.g., shown in FIGS. 3 and 7), the first and second flanges 106, 108 of each button 26, 28 contact the inner surface 72 of the cavity 66 of the male couple section 36 (i.e., the flanges 106, 108 retain the button 26, 28 within the cavity 66 of the male couple section 36) and a portion of the body 92 of each button 26, 28 extends through the respective aperture 78, 80 within the male couple section 36. In the "depressed" position (e.g., shown in FIG. 4), a button 26, 28 is pushed inwardly so that the contact surface 102 of that button 26, 28 is flush with, or below, the outer surface 70 of the male couple section wall 68. One of the button stops 116 is disposed on one lengthwise end of the buttons 26, 28, and the other button stop 116 is disposed on the other lengthwise end of the buttons 26, 28. The button stops 116a, 116c are positioned so that the spring 30 extends between the terminal end surfaces 124 of the stop flanges 122 (as can be seen in FIG. 7, an aperture is formed between the terminal end surfaces 124, and the spring 30 extends through the aperture). Inward radial travel of a button 26, 28 beyond, or slightly beyond, the depressed position is limited by the stop flanges 122; i.e., the base surface 104 of the button 26, 28 will contact the respective button side surface 126, 128 of the stop flange 122 and further inward travel is prevented. At the maximum inward radial travel, the stop flanges 122 prevent the contact surface 102 of a button 26, 28 from being disposed radially inward of the inner surface 72 of the cavity 66 of the male couple section 36. The heightwise openings formed by and between the side panels 120 allow the buttons 26, 28 to be received between the side panels 120. The button stops 116a, 116c prevent each button 26, 28 from depressing into the interior of the male couple section cavity 66 a distance where the button 26, 28 could get hung up within the male couple section cavity 66; e.g., if the button 26, 28 is depressed at an angle, an edge of the button body 92 could misalign with the respective aperture 78, 80 causing the button 26, 28 to get hung up in the cavity 66. The button stops 116 prevent this from happening.

To couple the first and second portions 22, 24 of the shaft coupling device 20, the male couple section 36 is inserted into the cavity 38 of the female couple section 34. In some embodiments, the buttons 26, 28 need not be aligned with the apertures 52, 54 disposed within the wall 40 of the female couple section 34. Relative rotation of the first and second portions 22, 24 of the shaft coupling device 20 will encounter the two potential alignment positions, at which point the biased buttons 26, 28 will travel radially outward and engage the apertures 52, 54 disposed in the wall 40 of the female couple section 34 of the first portion 22, thereby coupling the first and second portions 22, 24. In alternative embodiments, the mating geometry of the male couple section 36 and the cavity 38 of the female couple section 34 may be such that the two couple sections 34, 36 align automatically. In those embodiments that include a button body 92 with a tapered surface 114 at the forward end of the contact surface 102 and a chamfered surface 132 at the open end 48 of the female couple section cavity 38, the tapered surface 114 and the chamfered surface 50 facilitate depression of the button 26, 28 upon contact with each other, and thereby facilitate insertion of the male couple section 36 into the female couple section cavity 38.

In a coupled state (as shown in FIG. 3) the male couple section 36 is received within the cavity 38 of the female couple section 34 and a portion of the body 92 of each button 26, 28 extends through the aligned apertures 78, 80, 52, 54 within the male couple section 36 and the female couple section 34, respectively. Each button 26, 28 is positioned relative to the apertures 78, 80, 52, 54 such that the height 98 of the button 26, 28 is substantially parallel the axes 56, 82 of the apertures 78, 80, 52, 54. In this position, the length 96 of the button 26, 28 is substantially parallel to the lengths of the apertures 78, 80, 52, 54. The spring 30 biases the buttons 26, 28 in place. Now referring to FIG. 4, the first portion 22 and the second portion 24 of the shaft coupling device 20 may be uncoupled by depressing the buttons 26, 28 with the operator's fingers (or by other means) to a point where the button contact surfaces 102 are at or radially inside of the inner wall surface 44 of the cavity 38 within the female couple section 34. Once the buttons 26, 28 are depressed, the first portion 22 and the second portion 24 can be pulled apart to decouple.

The present shaft coupling device 20 provides several advantages. For example, the dual buttons 26, 28 make the shaft coupling device 20 faster to connect since less rotation is needed to engage the buttons 26, 28 once the male and female couple sections 36, 34 are joined together. Another advantage is that the dual buttons 26, 28 can increase the torque capability of the shaft coupling device 20 since the load is spread over two buttons. Yet another advantage is that the dual buttons 26, 28 are less likely to disengage while rotary cleaning since both buttons 26, 28 are less likely to be pressed at the same time which is needed to disconnect the two portions 22, 24. Yet another advantage is that the dual buttons 26, 28 may provide more control when working with tools while hanging straight down. For instance, a single button arrangement may cause attached shafts to drift off at an angle (i.e., non-linear) since the weight pulls the shaft coupling device 20 at an angle when several rods are attached. The dual buttons 26, 28 allow the rods to hang straight. This is very important when trying to make repairs with certain tools deep into a chimney flue.

Although this invention has been shown and described with respect to the detailed embodiments thereof, it will be understood by those skilled in the art that various changes in form and detail thereof may be made without departing from the spirit and scope of the invention. For example, the present coupling device 20 has been described above in the context of coupling shafts together; e.g., extension shafts. The present coupling device 20 is not limited, however, to shaft applications and can be used for a variety of applications where two components need to be positively attached to one another; e.g., attaching a tool to a shaft, etc. In addition, the present coupling device can be used to connect cables, hoses, etc.

What is claimed is:

1. A shaft coupling device comprising:
   a first portion having a female couple section and a first shaft mounting section, the female couple section includes a first cavity surrounded at least in part by a first wall, a first aperture extending through the first wall, a second aperture extending through the first wall, which first and second apertures are aligned with one another along a first axis;
   a second portion having a male couple section and a second shaft mounting section, the male couple section configured so as to be receivable within the cavity of the female couple section, the male couple section including a second cavity surrounded at least in part by a second wall, a third aperture extending through the second wall, a fourth aperture extending through the second wall, which third and fourth apertures are aligned with one another along a second axis;
   a first button having a body with a side surface extending between a contact surface and a base surface, and a flange extending outwardly from the side surface;
   a second button having a body with a side surface extending between a contact surface and a base surface, and a flange extending outwardly from the side surface;
   a spring; and
   a button stop having an end panel, a pair of side panels, and a stop flange, each side panel of said pair of side panels being oriented orthogonal to said end panel, said stop flange being oriented orthogonal to said end panel and each side panel of said pair of side panels, the stop flange and the side panels extend extending lengthwise outwardly from the end panel;
   wherein the spring, the button stop, and at least a portion of the first and second buttons are disposed within the second cavity of the male couple section, with the spring disposed between the buttons, biasing the buttons radially outwardly, and the side panels of the button stop are disposed on opposite sides of the spring and the stop flange extending extends outwardly from the end panel in a direction toward the spring and overlaps less than half of the flange of at least one of the first button and the second button;
   wherein when the first and second portions are coupled, the first and second buttons are biased radially outwardly in a normal position, and a portion of the first button body extends through the third aperture of the male couple section and into the first aperture of the female couple section, and a portion of the second button body extends through the fourth aperture of the male couple section and into the second aperture of the female couple section.

2. The shaft coupling device of claim 1, wherein the first and second buttons are shaped the same.

3. The shaft coupling device of claim 1, wherein the body of at least one of the first or second buttons has a width and a length, and the length is greater than the width.

4. The shaft coupling device of claim 3, wherein the body of the at least one of the first or second buttons is oval shaped.

5. The shaft coupling device of claim 1, wherein the first button has a tapered surface extending between the contact surface and the side surface of the first button, and the second button has a tapered surface extending between the contact surface and the side surface of the second button.

6. The shaft coupling device of claim 1, wherein the button stop includes a first button stop and a second button stop, each having the end panel, the pair of side panels, and the stop flange, with the stop flange and the side panels extending lengthwise outwardly from the end panel;
   wherein the first button stop is disposed on a first side of the spring within the second cavity of the male couple device, and the second button stop is disposed on a second side of the spring within the second cavity of the male couple device, such that the side panels of each button stop extend outwardly toward the side panels of the other button stop, and the stop flange of each button stop extends outwardly toward the stop flange of the other button stop.

7. The shaft coupling device of claim 6, wherein the side panels of each button stop have a length and the stop flange of each button stop has a length, and the length of the side panels for each button stop are greater than the length of the stop panel for that respective button stop.

8. The shaft coupling device of claim 6, wherein the stop flange of the first button stop has a terminal end surface, and the stop flange of the second button stop has a terminal end surface, and the spring is disposed between the terminal end surfaces of the stop flanges.

9. The shaft coupling device of claim 6, wherein the stop flanges are positioned to prevent the contact surface of one or both of the first button and second button from being disposed radially inward of an inner surface of the cavity of the male couple section.

10. The shaft coupling device of claim 1, wherein the female couple section includes a first cutout disposed in the wall of the female couple section, which first cutout intersects with the first aperture, and a second cutout disposed in the wall of the female couple section, which second cutout intersects with the second aperture.

11. The shaft coupling device of claim 1, wherein the first shaft mounting section includes a shaft bore for receiving a shaft.

12. The shaft coupling device of claim 1, wherein the second shaft mounting section includes a shaft bore for receiving a shaft.

13. The shaft coupling device of claim 1, wherein the first shaft mounting section is configured to connect a portion of an extension shaft.

14. The shaft coupling device of claim 1, wherein the first shaft mounting section is configured to connect a portion of a tool shaft.

15. A shaft coupling device comprising:
- a first portion having a female couple section and a first device mounting section, the female couple section includes a first cavity surrounded at least in part by a first wall, a first aperture extending through the first wall, a second aperture extending through the first wall, which first and second apertures are aligned with one another along a first axis;
- a second portion having a male couple section and a second device mounting section, the male couple section configured so as to be receivable within the cavity of the female couple section, the male couple section including a second cavity surrounded at least in part by a second wall, a third aperture extending through the second wall, a fourth aperture extending through the second wall, which third and fourth apertures are aligned with one another along a second axis;
- a pair of buttons, each having a body with a side surface extending between a contact surface and a base surface;
- a biasing member; and
- a button stop having an end panel and a stop flange, said stop flange being oriented orthogonal to said end panel and a stop flange, extending lengthwise outwardly from the end panel;
- wherein the biasing member, the button stop, and at least a portion of the first and second buttons are disposed within the second cavity of the male couple section, with the biasing member disposed between the buttons, biasing the buttons radially outwardly, and the stop flange extending extends outwardly from the end panel in a direction toward the biasing member without surrounding the biasing member.

* * * * *